Patented Oct. 4, 1938

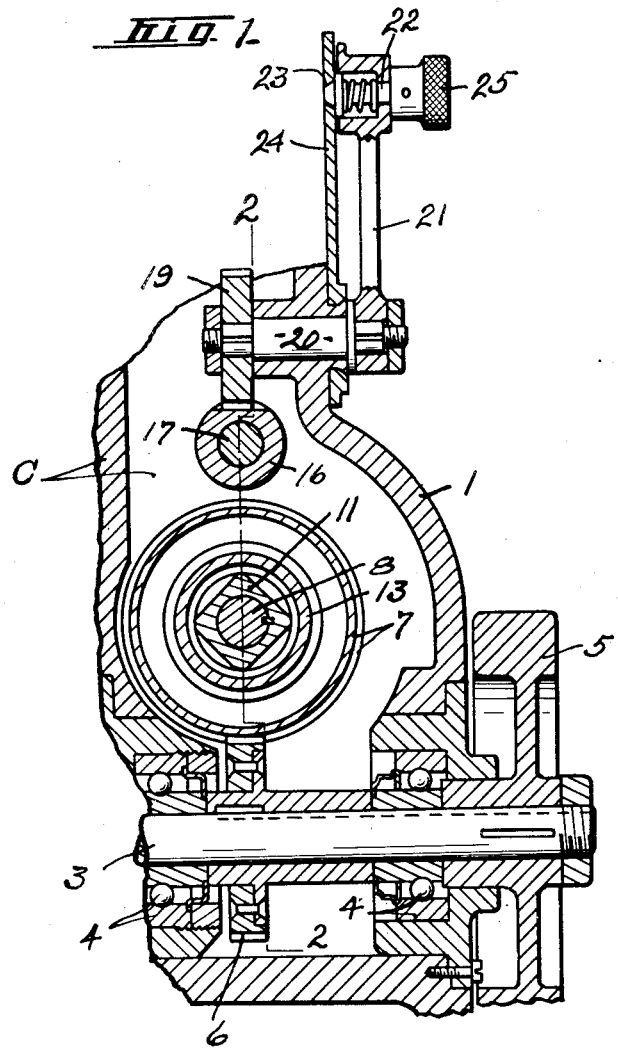

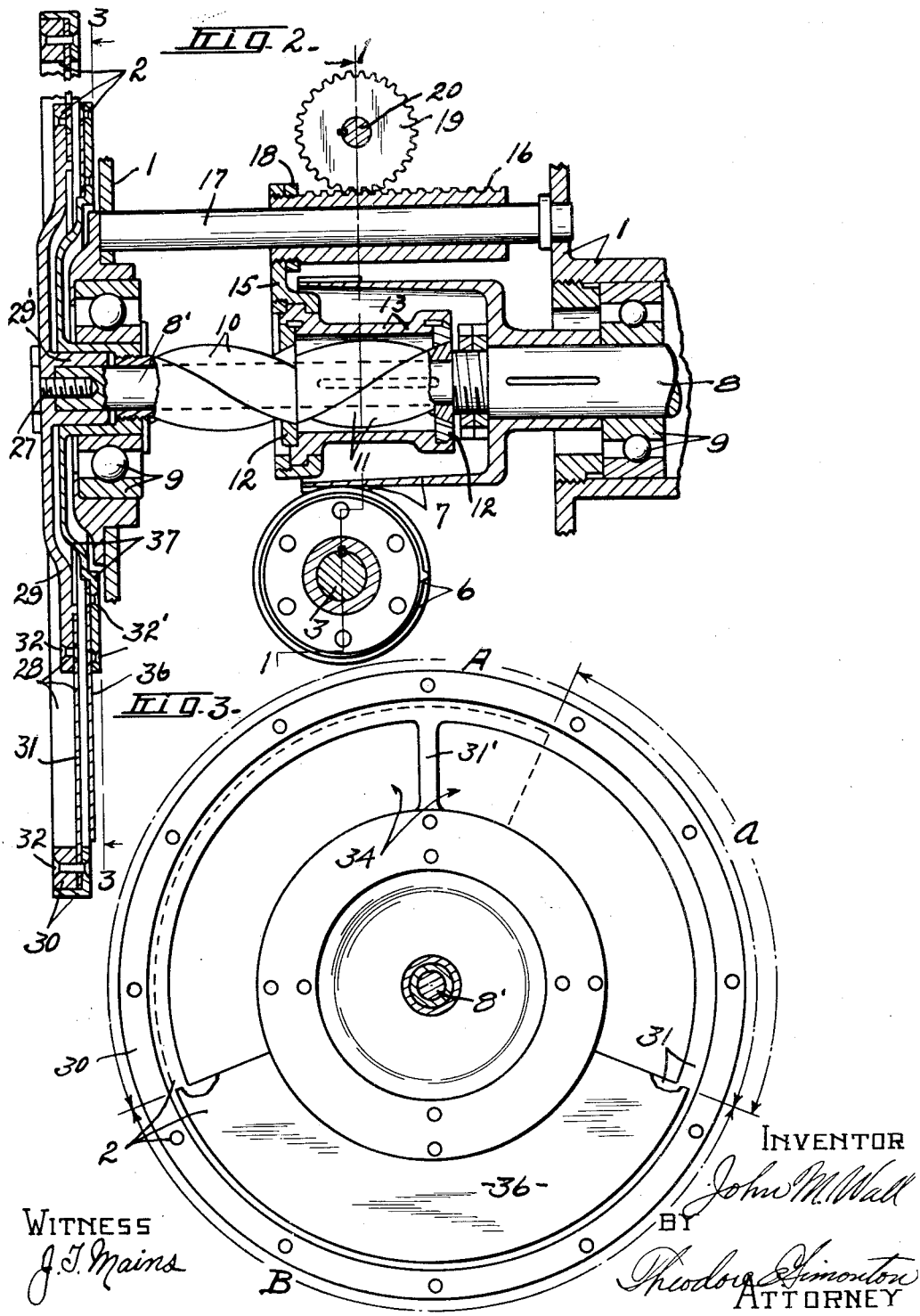

2,131,850

UNITED STATES PATENT OFFICE 2,131,850

MOTION PICTURE MACHINE

John M. Wall, Syracuse, N. Y.

Original application July 11, 1935, Serial No. 30,865. Divided and this application February 23, 1937, Serial No. 127,020

4 Claims. (Cl. 88—19.3)

This invention relates to new and useful improvements in motion picture machines in which a shutter is operated in synchronism with an intermediate feed mechanism for the film. The present invention relates more particularly to a shutter mechanism for a motion picture machine and is a division of my co-pending application Serial No. 30,865, filed July 11, 1935.

The main object of this invention is to provide an adjustable shutter, particularly adapted to be used in connection with an intermediate feed mechanism for a motion picture film wherein the time periods of the exposure of the film are considerably greater than the periods of the unexposure of said film.

Another object of the invention is to provide a novel drive mechanism for an adjustable shutter whereby the shutter may be adjusted to provide different sizes of exposure apertures therethrough during the operation of the machine.

A more specific object of the invention resides in providing a drive mechanism for an adjustable shutter that is simple in construction and operation and which is adapted to operate in a relatively small space to effect maximum adjustment of the shutter.

Other objects and advantages relating to the details of the structure and to the formation and operation of the parts thereof will more fully appear from the following description taken in connection with the accompanying drawings in which:

Figure 1 is a fragmentary vertical sectional view through one side of a motion picture machine case and the adjacent portions of the drive mechanism for operating the intermittent feed and shutter, the view being taken substantially in the plane of line 1—1, Figure 2.

Figure 2 is a detail vertical sectional view through the shutter and a portion of the drive mechanism therefor taken substantially on line 2—2, Figure 1 and showing a section of the upper portion of the shutter broken away.

Figure 3 is a transverse sectional view taken on line 3—3, Figure 2.

The device as illustrated in the drawings may be arranged in any suitably constructed case as C which, as shown in part in Figure 1, is adapted more particularly for a camera and comprises a body portion 1 which is adapted to support my novel shutter 2 and the drive mechanism therefor, together with an intermittent film feed mechanism and a suitable lens arrangement for the film. The feed mechanism and lens are not shown as they do not comprise a part of this invention. However, these units may be of any well known construction and may be mounted in the case in cooperative relation with the shutter and with each other in any suitable manner.

In Figure 1, I have illustrated a portion of a drive shaft 3 adapted to be connected in any suitable manner with the cam shaft, not shown, for operating the intermittent film feed mechanism. The drive shaft 3 is disposed in a horizontal plane transversely of the case C and is journaled in a pair of suitably spaced ball bearings 4 carried in adjacent portions of the camera case. The outer end of the drive shaft 3 extends a short distance beyond the case C and has secured thereto a balance wheel 5. The drive shaft 3 is provided with the usual worm gear 6 which may be secured thereto in any suitable manner and is in meshing engagement with a worm 7 mounted on a shutter shaft 8 which extends longitudinally through the case C at the rear of the film chamber of the case as is usual in this class of instrument.

The shaft 8 is journaled in suitable axially spaced bearings 9 mounted in the body 1 as indicated in Figure 2. This shutter shaft is of novel construction in that the forward end portion 8' thereof is reduced in diameter and has operatively associated therewith a compound screw comprising a pair of screw members 10 and 11. These screw members are arranged in longitudinal spaced relation upon the portion 8' of the shutter shaft and one of said members as 11 is keyed to the shaft so as to rotate therewith, while the other screw member 10 is rotatably mounted upon the shaft. As illustrated in Figures 1 and 2, these screw members 10 and 11 are substantially square in cross section with the flat sides extending longitudinally thereof in spiral relation to the axis of the members, while the direction of the spiral of the member 10 is the reverse of that of the member 11. A nut 12 is operatively connected with each screw member 10 and 11 and these nuts are secured at respective ends of a tubular housing 13 which extends longitudinally of the shutter shaft and is maintained in co-axial relation therewith by the nuts 12.

The forward or outer end of the housing 13 has rotatably mounted thereon an arm 15, which extends upwardly at one side from said housing and is provided at its outer end with a threaded aperture in which is screw threaded one end of a rack member 16. The rack 16 is a tubular member and is slidably mounted upon a guide rod 17 mounted in the body 1 above the shutter shaft 8 in parallel relation therewith. The rack 16 and arm 15 may be securely locked together by a nut 18 screw threaded on the forward end of the rack. A pinion 19 is secured to one end of a stub shaft 20 which, as shown in Figure 1, is journaled in the body portion 1 of the case C and extends outwardly therefrom a relatively short distance. The shaft has secured to the outer end thereof a crank arm 21 which is provided at its upper end with a spring pressed plunger 22, said plunger being adapted to engage in any one of a series of apertures or indentations 23 provided in an index plate 24 secured to the adjacent wall 1 of the case C. The outer end of the plunger 22 is provided with a knurled knob 25 by which the pin may be withdrawn from an aperture or indentation 23 and the arm 21 moved about the axis of the shaft 20 to bring said pin into registration with another one of the apertures 23 and produce a corresponding axial movement of the rack 16 and housing 13 connected therewith through the medium of the pinion 19.

The forward end of the shutter shaft 8 has secured thereto as by the screw 27 the body portion 28 of my novel shutter 2 so that the member 28 of the shutter will be rotated in unison with the shaft 8. This body portion of the shutter comprises, in this instance, a central disk shaped member 29, a marginal sectional rim member 30 and an intermediate relatively thin plate member 31 which is secured at its inner and outer edges to the central disk 29 and rim 30 as by rivets 32. The shutter plate 31 is provided with an arcuate exposure opening 34 arranged concentric therewith and which, in this instance, extends through an arc A of substantially 225°. The plate 31 may, as shown in Figure 3, be provided with a relatively narrow tie strip 31' arranged substantially midway between the ends of the exposure opening 34 for reenforcing purposes. It is obvious that this tie strip is of such relatively small width it will not interfere to any appreciable extent with the photographing of a picture as said strip passes in front of the exposure aperture, not shown, provided in the case C, and it may be eliminated if desired, without changing the function of the shutter or seriously impairing the structure thereof.

An auxiliary shutter plate 36 is mounted in the rear of the shutter plate 31, and is secured as by rivets 32' to a supporting member 37 which, in turn, is journaled upon the hub 29' of the supporting member 29 and within the bearing member 9 positioned at the forward end of the shutter shaft 8, said supporting member 37 being secured by screw threads or the like, as illustrated in Figure 2 to the forward end of the screw member 10 to rotate in unison with said screw member. The auxiliary shutter plate 36, in this instance, extends through substantially an arc B of 135° so that when positioned in registration with the closed portion of the shutter plate 31, the exposure opening 34 will be fully open and when moved into full registration with the exposure opening 34, as illustrated by broken lines in Figure 3, the shutter will be partially closed thereby and will have an effective exposure opening extending through substantially an arc —a— of 90°.

The shutter supporting members 29 and 37 are so secured to the shaft 8 and screw member 10, respectively, that when the housing 13 and nuts 12 are maintained in their innermost position with the nuts in engagement with the rear ends of respective screw members 10 and 11, as illustrated in Figure 2, the auxiliary shutter plate 36 will be in registration with the closed portion of shutter plate 31 as illustrated by full lines in Figure 3. It will thus be observed that as the shutter shaft 8 is rotated, shutter 2 will be rotated thereby in its maximum open position with the auxiliary shutter plate 36 rotated in unison with the closed portion of shutter plate 31. This is due to the fact that the screw member 10 is driven by the nut 12 engaged therewith and with the housing 13 in unison with the other screw member 11 and the shaft 8 through the medium of nut 12 engaged with the screw member 11.

When it is desired to close the aperture opening 34 of the shutter to a greater or lesser degree, this may be readily accomplished during the operation of the shaft 8 by the manipulation of the arm 21 for moving the rack 16 forwardly along the guide rod 17. As the rack 16 is thus moved longitudinally, the arm 15 will produce a corresponding axial movement of housing 13 and nuts 12 carried thereby. As the nut 12 engaged with the screw member 11 moves axially along the screw member, the housing 13 will be rotated a corresponding degree in one direction relative to the screw 11, thereby producing a similar rotation of nut 12 in engagement with the screw member 10 and at the same time, the forward axial movement of the nut 12 along the screw member 10 will produce an additional rotation of said screw member relative to the housing 13 in the same direction as the direction of rotation of said housing, thereby producing a given degree of rotation of the auxiliary shutter plate 36 with a minimum amount of axial movement of housing 13 and rack 16 to effect the desired degree of closing of the shutter opening.

It will now be readily understood that while the drive shaft 3 and the shutter shaft 8 are operated at a uniform constant rate of speed in the conventional manner, as by a motor, not shown, operatively connected with the shutter shaft, the period of time of exposure of the film to the light may be readily controlled by the manipulation of the auxiliary shutter plate through the medium of the arm 21 and the mechanism actuated thereby to decrease or increase the effective size of the shutter opening. From the above description, it will be apparent that a motion picture machine equipped with my adjustable shutter may be effectively operated with lights of higher and lower intensity than may be accomplished with the conventionally constructed shutters due to the fact that the period of time of exposure of the film to the light may be readily controlled by the manipulation of the auxiliary shutter plate during the operation of the machine.

Furthermore, it will be apparent that my novel shutter control mechanism may operate in a very small compact space due to the co-action of housing 13 and the compound screw consisting of members 10 and 11 which comprise units adapted to produce a plurality of lever increasing actions for operatively connecting the control arm 21 and rack 16 with the auxiliary shutter plate 36.

Although I have shown and particularly described the preferred form of my invention, I do not wish to be limited to the exact details set forth, as various changes may readily be made therein without departing from the spirit of the invention as set forth in the appended claims.

I claim:

1. A shutter mechanism for motion picture machines or the like, comprising a shutter element having an exposure aperture extending therethrough, a closure element mounted adjacent said shutter element, a shutter shaft secured to one of the elements to produce rotation thereof, right handed and left handed screw members arranged in axial aligned relation with each other and secured respectively to the shutter shaft and to the other element, and manually controlled means operatively connected with the screw members for producing relative movement of the closure element and shutter element to vary the effective size of the exposure aperture.

2. A shutter mechanism for motion picture machines or the like, comprising a pair of co-operating shutter elements, at least one of said elements having an exposure aperture extending therethrough, operating means for rotating said elements in unison, said operating means including a pair of screw members, each connected with a respective one of the shutter elements to produce rotation thereof, said screw members being arranged end to end in substantially co-axial relation and to rotate with respect to each other, control means having screw-threaded engagement with both of said screw members for connecting said members to each other and movable axially with respect thereto for producing relative rotary movement thereof whereby the effective size of the exposure aperture may be varied, and means adapted to be operated while the screw members are in rotation to produce said axial movement of the control means.

3. In a motion picture machine wherein is provided a shutter composed of shutter elements relatively adjustable for varying the effective size of the exposure opening, in combination, a drive shaft fixedly secured to one of said shutter elements to produce rotation thereof, an additional drive member rotatably mounted on the shaft and connected with the other shutter element to produce rotation thereof, means for transmitting motion from the shaft to the drive member including a control member mounted for movement longitudinally of said shaft, means including two nut members connected in spaced relation to the control member providing screw-threaded engagement of the control member with the shutter shaft and drive member, and manually operated means for producing said longitudinal movement of the control member whereby said drive shaft and the drive member will be rotated with respect to each other.

4. In a motion picture machine of the class wherein a shutter shaft adapted to be connected directly with a source of power and a second shaft for driving an intermittent film feeding mechanism are mounted to rotate about axes extending in substantially right angular relation to each other and wherein a shutter comprises a pair of co-operating plates, in combination, means for securing one of said shutter plates to the shutter shaft, a pair of screw members, one of said screw members being connected with the shaft to rotate therewith, the second of said screw members being rotated upon the shaft and connected with the second shutter plate to produce rotation thereof, means for transmitting rotary motion from the shutter shaft to said second shaft including a gear mounted on the shutter shaft to rotate therewith and having a chamber in one side thereof receiving one of said screw members therein, a control member having screw-threaded engagement with said screw members mounted for axial movement with respect thereto and adapted to be received in the chamber of the gear member, and manually operated means for producing said axial movement of the control member to effect relative rotary movement of said screw members.

JOHN M. WALL.